Sept. 23, 1969   E. A. MAYER   3,468,329
PRESSURE AMPLIFIER
Filed March 28, 1966   2 Sheets-Sheet 1

INVENTOR.
ENDRE A. MAYER
BY

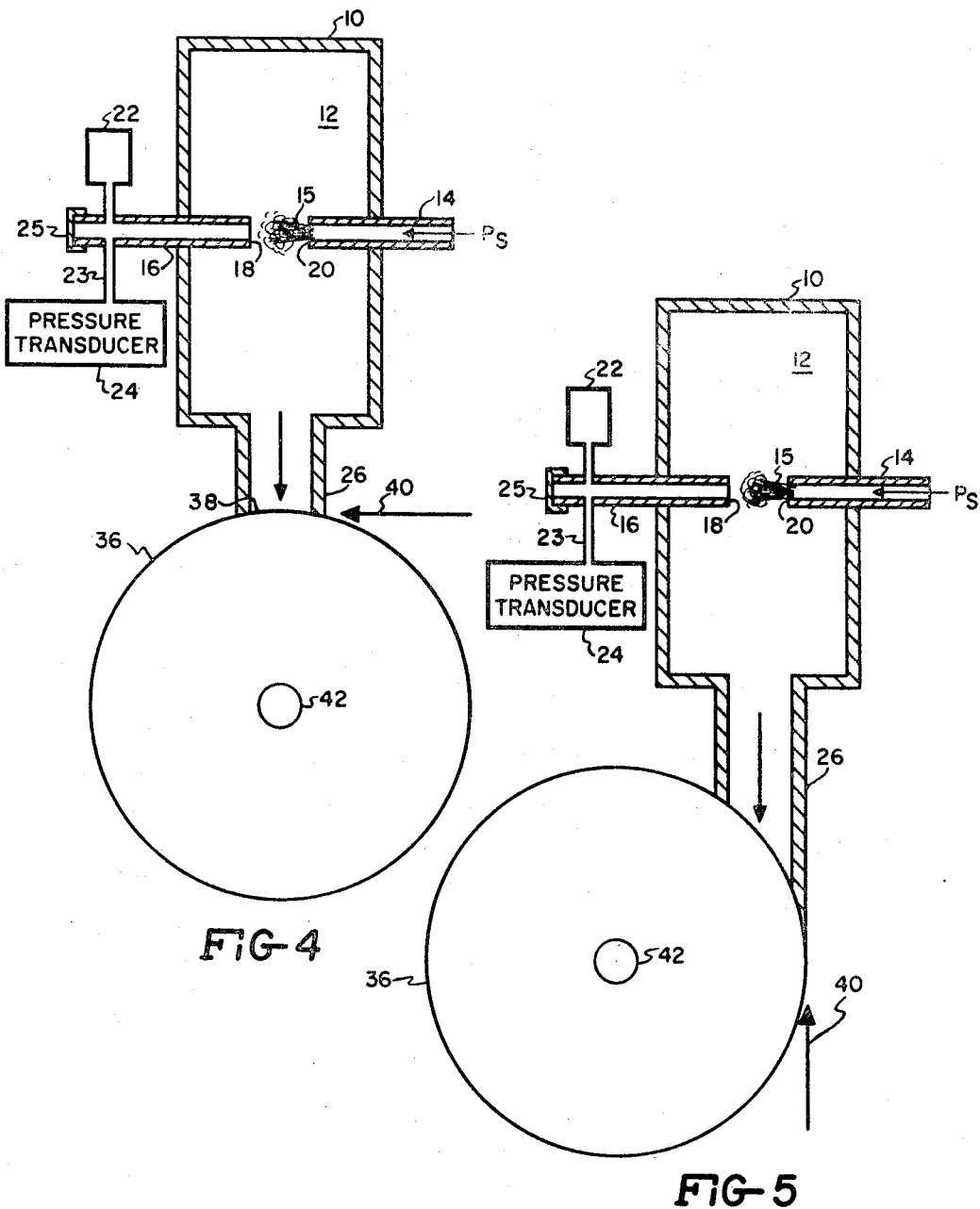

United States Patent Office 3,468,329
Patented Sept. 23, 1969

3,468,329
PRESSURE AMPLIFIER
Endre A. Mayer, Birmingham, Mich., assignor to The
Bendix Corporation, a corporation of Delaware
Filed Mar. 28, 1966, Ser. No. 537,861
Int. Cl. F15c 1/08
U.S. Cl. 137—81.5            8 Claims

ABSTRACT OF THE DISCLOSURE

A pressure amplifier having an input tube and an axially aligned output tube extending into a housing in combination with means for varying the pressure in the housing to control the amount of flow from the input tube which enters the output tube.

---

This invention relates to a pressure amplifier and more particularly to a jet pressurization amplifier.

In accordance with the invention a jet of gas, such as air, is supplied under pressure into a chamber defined by a housing and a particular amount of this supply pressure is recovered at an output in the housing depending upon the pressure maintained in the chamber. Means are provided to vary the pressure in the chamber and thus control the amount of pressure recovered at the output.

It is an object of this invention to provide a pressure amplifier which utilizes a gas jet under pressure.

It is another object of this invention to provide an amplifier of the above character wherein the gas jet is introduced into a chamber and the jet pressure recovered at an output is controlled in accordance with the pressure in the chamber.

A further object of this invention is to provide an amplifier of the above character wherein the pressure in the chamber is controlled by a vortex valve.

Other objects and advantages will become apparent from the following detailed description and from the appended claims and drawings.

In the drawings:

FIGURE 4 is a schematic representation of the device in FIGURE 1 showing it connected to a vortex valve.

FIGURE 5 is another schematic representation of the device in FIGURE 1 showing it connected to the vortex valve in a different manner.

Figure 1:
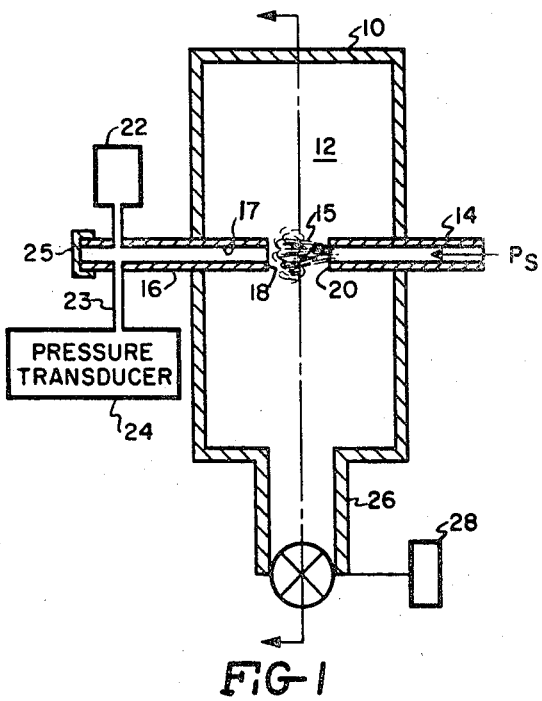
FIGURE 1 is a schematic representation of a side sectional view of an embodiment of this invention.
Figure 2:
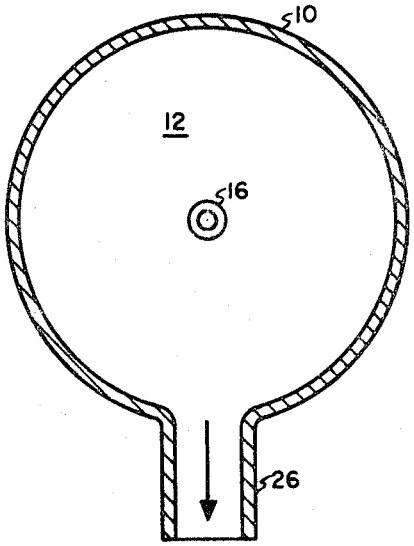
FIGURE 2 is a front sectional view taken substantially along line 2—2 of FIGURE 1.

In FIGURE 1 a housing 10 defines a cylindrical chamber or cavity 12. An input tube 14 extends through the housing 10 for supplying a jet 15 of gas, such as air, under pressure $P_s$ into the chamber 12. Also extending through the housing 10 and into the chamber 12 is an output tube 16 having a bore 17. The tubes 14 and 16 have substantially the same diameter and are longitudinally aligned. The inner end 18 of the tube 16 is positioned at a particular distance from the inner end 20 of the tube 14. For example, in one embodiment of the device in FIGURE 1 that was built, the distance $l$ between the ends 18 and 20 was 0.120 inch and the diameter $d$ of the tubes 14 and 16 was 0.060 inch. Accordingly, the ration $l/d$ was 2.00. It can be seen in FIGURE 2 that the inner end 18 of the output tube 16 has a surface area which is not substantially greater than the cross-sectional area of the bore 17 of the tube 16. That is, the surface area of end 18 is the same order of magnitude as or less than the cross-sectional area of the bore 17.

A pressure gauge 22 extends into the tube 16 to provide an indication of the pressure recovered by the tube 16. Also, the tube 16 is connected by a line 23 to a load such as a pressure transducer 24. A cap 25 blocks the outer end of the tube 16. A line 26 extends from the housing 10 to vent the chamber 12 to atmospheric pressure and a valve such as a gate valve 28 positioned in the line may be operated by hand to vary the size of the vent opening and thus control the pressure in the chamber 12. By closing the valve 28, the vent opening is restricted and in this way the pressure in the chamber 12 is increased.

In the operation of the amplifier described above, air under constant pressure, such as 75 p.s.i.g., is introduced through the tube 14 by suitable means not shown to produce the jet 15 as shown in FIGURE 1. A portion of the jet pressure which is substantially the same as the supply pressure $P_s$ is recovered by the tube 16. The amount of output pressure $P_o$ recovered by the tube 16 is dependent upon the pressure $P_c$ maintained in the chamber 12 which is controlled by the opening of the valve 28.

Figure 3:
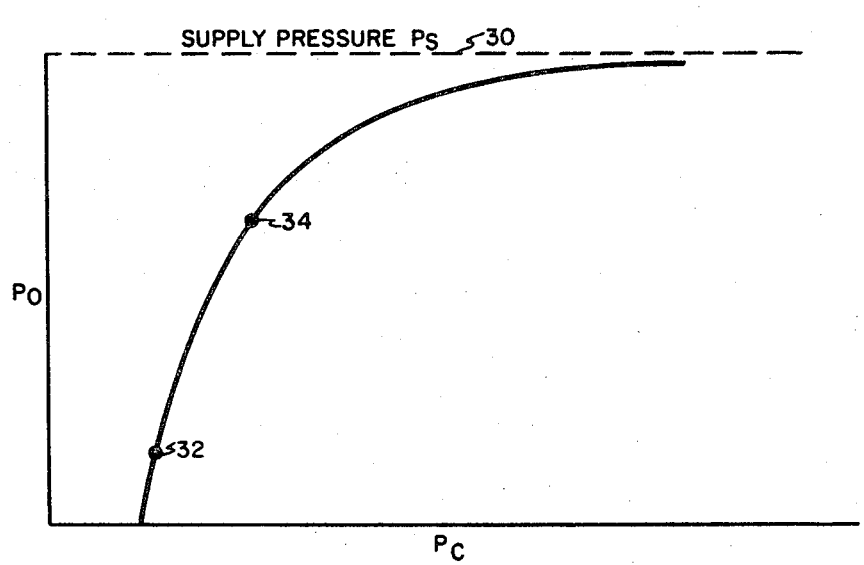
FIGURE 3 is a graph showing the pressure output of the device in FIGURE 1 under different conditions.

Referring to FIGURE 3 the supply pressure $P_s$ which is constant is shown at 30. In the fully open position of valve 28, a pressure output $P_o$ as indicated at point 32 is obtained. As the valve 28 is closed to restrict the opening in the line 26, the pressure $P_o$ increases linearly over a range up to the point 34. Because of the relatively steep increase in the pressure output of the tube 16 as a result of a small change in the pressure of the chamber 12, the device described can be operated as a pressure amplifier. Referring again to the graph in FIGURE 3, it will be noted that as the pressure in the chamber 12 is increased from the point 34 by closing the valve 28, the recovery by the tube 16 is increased almost substantially to the same value as the supply pressure. Thus the recovery is substantially 100%.

Another embodiment of the invention is shown in FIGURE 4. In this embodiment the gate valve 28 of FIGURE 1 is replaced by a vortex valve schematically shown at 36 in FIGURE 4. The vortex valve 36 has an inlet 38 for introducing fluid radially into the vortex chamber of the valve, a control port 40 for introducing control flow tangentially into the vortex chamber to impart a rotational velocity to the fluid introduced through the inlet 38 and an axial outlet 42 for exhausting the fluid from vortex chamber. The output from the chamber 12 is introduced into the vortex chamber through the line 26 and the inlet 38. The tangential control flow, which in this case would be air under pressure is introduced to the port 40 to impart a rotational velocity or vorticity to the fluid introduced through the inlet 38.

Any increase of the control flow, increases the vorticity in the vortex chamber thus causing an increased back pressure at the inlet 38 of the valve 36 and a resultant increase in the pressure in the chamber 12. Accordingly, by controlling the control flow at the port 40, amplification of the pressure output $P_o$ can be achieved in accordance with the graph of FIGURE 3 in the same manner as controlilng the opening of the gate valve 28.

A further embodiment of the invention is shown in FIGURE 5. In this embodiment the vortex valve 36 is connected such that the output from the chamber 12 through the line 26 is introduced tangentially into the vortex chamber and the control flow at the port 40 is also introduced tangentially and in a direction opposing the inlet flow from the chamber 12. Accordingly, the main flow introduced into the vortex chamber already has vorticity which is then opposed by the control flow to control the pressure in the chamber. A bias control flow may be provided to normally maintain the pressure output $P_o$ at a point such as 34 in FIGURE 3. Then the control flow signal is added thereto to reduce $P_o$ in the range between 34 and 32.

I claim:

1. A pressure amplifier comprising:
   a housing providing a chamber,
   supply opening means for introducing a jet of gas into the housing,
   an output tube extending through the housing and into the chamber, said output tube having a bore therein with a predetermined cross-sectional area and an end in the chamber providing a bore opening in alignment with said supply opening means for recovering the pressure of the jet, said output tube end having an area which is approximately the same order of magnitude as or less than said cross-sectional area of said bore,
   said supply opening and said output tube bore opening being spaced from each other, and
   means separate from said supply opening means for varying the pressure in the chamber to control the amount of the jet pressure recovered by said output opening in direct proportion to the pressure within the chamber.

2. A pressure amplifier as recited in claim 1 wherein the means for varying the pressure in the chamber comprises an outlet from the housing and a variable valve in the outlet to control the amount of gas being exhausted from the housing.

3. A pressure amplifier as recited in claim 1 wherein the means for varying the pressure in the chamber comprises an outlet from the housing and a vortex valve connected to the outlet to control the amount of gas being exhausted from the housing.

4. A pressure amplifier as recited in claim 1 wherein the means for varying the pressure in the chamber comprises an outlet from the housing to vent the gas therefrom, a vortex valve connected to the outlet to receive the gas radially into the vortex chamber of the valve, and a control port in the valve for introducing control gas tangentially into the vortex chamber.

5. A pressure amplifier as recited in claim 1 wherein the means for varying the pressure in the chamber comprises an outlet from the housing to vent gas therefrom, a vortex valve connected to the outlet to receive the gas tangentially into the vortex chamber of the valve, and a control port in the valve for introducing control gas tangentially into the vortex chamber in a direction opposite to the gas flow from the outlet of the housing.

6. A pressure amplifier as recited in claim 1 wherein the output tube is closed at its other end thereby preventing a net flow therethrough.

7. A pressure amplifier as recited in claim 1 wherein said supply opening means is a tube extending into the chamber.

8. A fluid device comprising:
   a housing providing a chamber,
   supply opening means for introducing a jet of fluid into the housing,
   an output tube extending through the housing and into the chamber, said output tube providing an output opening in alignment with said supply opening means for recovering the pressure of the jet,
   said supply opening and said output opening being spaced from each other, and
   means separate from said supply opening means for varying the pressure in the chamber to control the amount of the jet pressure recovered by said output opening in direct proportion to the pressure within said chamber.

References Cited
UNITED STATES PATENTS

| | | | |
|---|---|---|---|
| 1,628,723 | 5/1927 | Hall | 137—81.5 XR |
| 3,182,674 | 5/1965 | Horton | 137—81.5 |
| 3,219,048 | 11/1965 | Palmisano | 137—81.5 |
| 3,267,946 | 8/1966 | Adams et al. | 137—81.5 |
| 3,272,215 | 9/1966 | Bjornsen et al. | 137—81.5 |
| 3,285,263 | 11/1966 | Bjornsen et al. | 137—81.5 |
| 3,311,120 | 3/1967 | Palmisano | 137—81.5 |
| 3,313,313 | 4/1967 | Katz | 137—81.5 |
| 3,324,891 | 6/1967 | Rhoades | 137—81.5 XR |
| 3,336,931 | 8/1967 | Fox et al. | 137—81.5 |
| 3,351,080 | 11/1967 | Datwyler, et al. | 137—81.5 |

SAMUEL SCOTT, Primary Examiner